United States Patent [19]

Fujisawa

[11] Patent Number: 4,879,155
[45] Date of Patent: Nov. 7, 1989

[54] PLEATED CLOTH AND METHOD FOR PRODUCING THE SAME

[76] Inventor: Mitsuo Fujisawa, 1-6, Maeishiki 1-chome, Gifu-City, Japan, 500

[21] Appl. No.: 54,265

[22] Filed: May 26, 1987

[30] Foreign Application Priority Data

May 27, 1986 [JP] Japan ............................. 61-121894

[51] Int. Cl.$^4$ .................... D06C 23/04; D06C 25/00; D06H 7/22; D06Q 1/00
[52] U.S. Cl. ........................................ 428/131; 2/222; 2/243 R; 38/144; 156/73.1; 156/73.2; 156/88; 428/134; 428/181; 428/187; 428/193; 428/194; 428/296
[58] Field of Search ................ 38/144; 156/73.1, 73.2, 156/88; 428/193, 194, 296, 181, 131, 187

[56] References Cited

U.S. PATENT DOCUMENTS

| | | | |
|---|---|---|---|
| 4,187,132 | 2/1980 | Dijk ........................................ | 156/88 |
| 4,364,785 | 12/1982 | Wajs et al. ............................ | 156/88 |
| 4,560,427 | 12/1985 | Flood .................................... | 156/88 |
| 4,610,750 | 9/1986 | Mango ................................... | 156/88 |
| 4,693,771 | 9/1987 | Fayel et al. ........................... | 156/88 |

OTHER PUBLICATIONS

"Ultrasonic Embossing" found in last column of p. 438 of *Plastic Finishing and Decorations*, edited by Satas and published by VNR Company, 1986.

*Primary Examiner*—James C. Cannon
*Attorney, Agent, or Firm*—Lorusso & Loud

[57] ABSTRACT

Pleated cloth made of thermoplastic resin is enhanced in its appearance by providing a film pattern section to the end of the cloth to melt a certain part of pleating. This invention relates to an improved pleated cloth and the method for producing the same, and the method for producing the improved pleated cloth includes the steps of: forming pleating on the cloth made of thermoplastic resin; melt-forming a film pattern section on the adequate area of the pleating lines by using a patterned roller and an ultrasonic generator; and erasing a certain area of the pleating lines by the provision of the film pattern section. The product as above improves over the prior art in that it eliminates the need for the sewing machine and thread used in conventional hemming.

2 Claims, 4 Drawing Sheets

PLEATED CLOTH AND METHOD FOR PRODUCING THE SAME

BACKGROUND OF THE INVENTION

1. (Technical Field)

This invention relates to improved pleated cloth and method for producing the same by providing pleating work on the cloth made of thermoplastic fiber or woven or non-woven cloth including thermoplastic synthetic fiber.

2. (Prior Art)

In the prior art, cloth sewed on the front chest of a blouse for ornament is mechanically worked so that it presents a circular end forming an arc and or wavy line, after pleating work is finished for the decoration purpose.

For working the pleated cloth so that the hem defines an arc form and presents wavy line, it is required to erase the pleated lines at the end edge of the cloth. In the prior art method, the end of the pleated cloth are hemmed with thread (11) by utilizing a sewing machine. The cloth made according to the prior art methods is shown in FIGS. 9 and 10.

However, the method as above needs another device such as a sewing machine for sewing down the end edge, besides the pleating device. The prior art method is inconvenient since the provision of the sewing machine increase the number of working processes and requires much thread indispensable for sewing down the end edge which adversely affects the appearance of the products.

SUMMARY OF THE INVENTION

This invention is attained to overcome the defects of the prior art, and the gist of the present invention is improved pleated cloth and a method for producing the same which involves erasing pleated lines formed on the certain area of the cloth made of thermoplastic resin by providing a film section by melting and cutting the end edge of the cloth. The method according to the present invention includes steps of: performing pleating work on the cloth made of thermoplastic fiber and providing a film pattern section on an adequate portion of the pleated lines by utilizing ultrasonic melting by a roller, thereby erasing pleating in that section of the cloth.

An object of the present invention is to provide a product of pleated cloth and a method for producing the same which enables one to erase pleated lines while welding fibers of the end edge of the pleated cloth with no need of other device such as a sewing machine.

Another object of the present invention is to provide an improved pleated cloth, and a method for producing the same, which is excellent in appearance by welding of the edge threads of the pleated cloth while providing the fabric edge with an arc form and wavy appearance.

Another object of the present invention is to provide an improved method for producing pleated cloth which saves on the number of working processes by enabling erasure of the pleated lines and melt cutting of the end edge of the pleated cloth simultaneously. This method contributes much to working efficiency.

BRIEF DESCRIPTION OF DRAWINGS

By way of the example and to make the description more clear, reference is made to the accompanying drawings, in which.

DETAILED DESCRIPTION OF THE PREFERRED EMBODIMENT

These and other objects will become more apparent when a preferred embodiments of this invention is considered in connection with the drawings.

Figure 1:
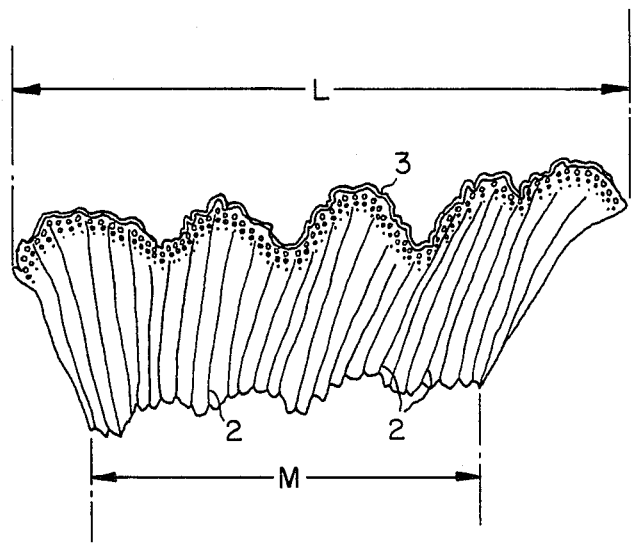
FIG. 1 is a perspective view of one example of pleated cloth which are produced by adopting the method of the present invention.

FIG. 1 is a perspective view showing one example of the pleated cloth according to the present invention.

According to this example, pleated cloth which is woven or non-woven cloth made of synthetic fiber, i.e., thermoplastic fiber-containing cloth, may be used to obtain the finished product.

In this example, a plurality of pleated lines (2) are formed at intervals in the longitudinal direction of the cloth (1), and a strip-like film (3) is provided at the end edge of the pleated cloth (1) in a continuous manner which results in a semi-circular arc repeat form which prevents unraveling of fabric edge threads. The shape of strip-like film (3) is not limited to semi-circular arc form which is utilized in this example, and it may be a straight line, for example. This shape of the strip-like film, which determines the cutting line, is varied depending on the products to be made.

Figure 2:
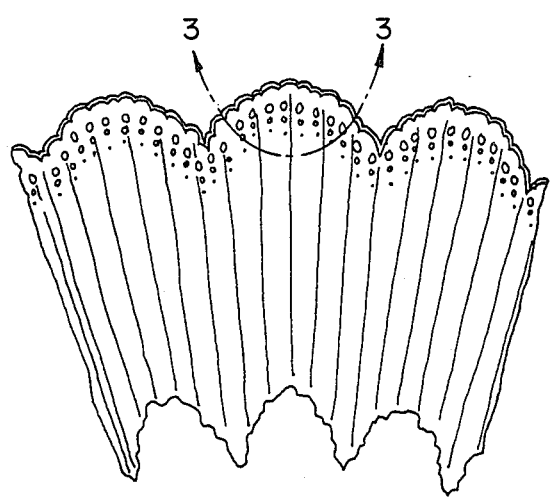
FIG. 2 is a plan view of the example shown in FIG. 1.
Figure 3:
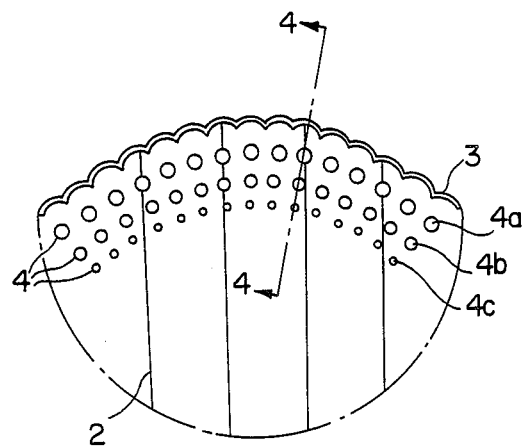
FIG. 3 is a partially enlarged cross-section cutting along line A—A.

FIG. 2 is a plan view showing an example of FIG. 1, and FIG. 3 is a partially enlarged cross-section cutting along line A—A.

Figure 4:
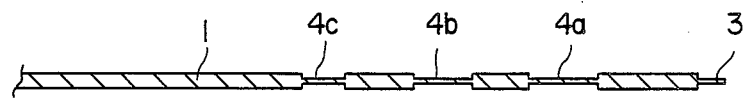
FIG. 4 is a cross-section cutting along line B—B.

Film-like pattern section (4) is provided the pleated cloth (1) in parallel alignment with strip-like film (3). In this example, the film pattern section (4) includes three circular film pattern portions (4a), (4b), and (4C) which are different from each other in size and the film pattern portions (4a), (4b), and (4c) form three lines so that the hem of the pleated cloth (1) presents natural curved line in the longitudinal direction of the pleated lines. FIG. 4 shows a cross-sectional view of the film pattern section shown in FIG. 3 along line B—B in which the circular film pattern portions (4a), (4b) and (4c) vary in size.

Figure 5:
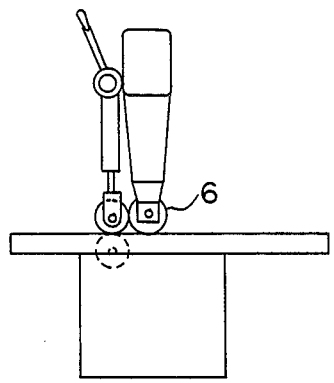
FIG. 5 is a plan view showing the combined state of the ultrasonic wave generator with a roller.

As shown in FIG. 5, by passing the pleated cloth (1) between a known ultrasonic wave generator and the roller (6), the fabric is cut, forming strip film (3), and, simultaneously, film pattern (4), including melt-cut film pattern portions (4a), (4b) and (4c), is formed.

This example includes a film pattern section having 3 lines of circular film pattern portions (4a) (4b) and (4c), however, the number of the lines are not limited to three and it may be much more or much less. Also, the shape of the pattern is not limited to an arc, and the shape may have many variations such as a star or a flower depending on the desired pattern to be formed.

The film pattern section (4) is always kept crossing the pleated lines. The reason for this is when the film pattern section includes only one line of the film pattern portion (4a) and the pleated lines (2) are positioned within the film pattern portion (4a), erasing of the pleated lines (2), which is one of the important effects of the present invention, is not obtained.

The film pattern section (4) is melt-formed on the pleated cloth and causes sectional erasure of originally formed pleats. As can be recognized from FIG. 1, the dimension (L) which indicates the width of an end finished with a film pattern section (4) is made greater than the dimension (M) which indicates the width of other end of the cloth by the dimension which is variable in proportion to the melting amount of the pleated lines (2).

Because of this, the pleated cloth (1) define a circular arc at the hem thereof or present wavy appearance in the (L) side of the cloth.

The method for producing the improved pleated cloth (1) are explained in detail hereinunder.

Figure 8:
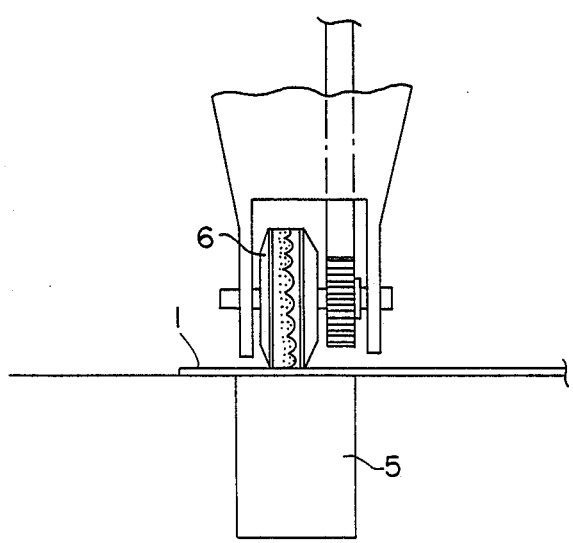
FIG. 8 is a partially enlarged side elevation showing main parts of FIG. 5.
Figure 9:
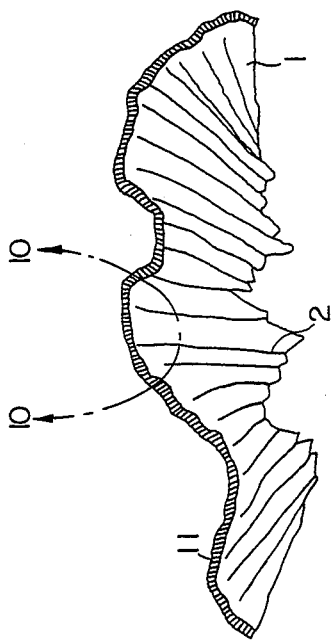
FIG. 9 is a perspective view of the pleated cloth according to the prior art.
Figure 10:
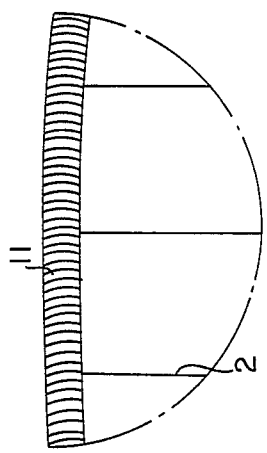
FIG. 10 is a partially enlarged cross-section of FIG. 9 cutting along line C—C.

The pleated cloth (1) including pleated lines (2) is passed by between the ultrasonic wave generator (5) and a roller (6) as shown in FIG. 8.

Figure 6:
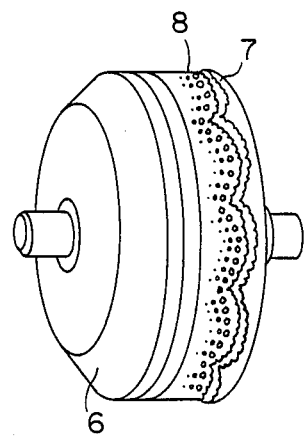
FIG. 6 is a perspective view of the roller.
Figure 7:
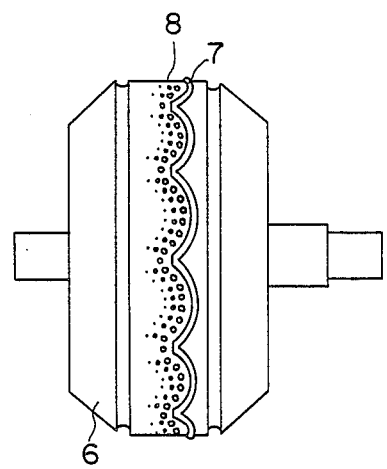
FIG. 7 is a plan view of another example of the roller.

As shown in FIGS. 6 and 7, the roller of this example includes continuous wave-like protrusion (7) and continuous dot-like protrusions (8), both of which are formed by way of electrodischarge machining.

By exposing the protrusions (7) and (8) to the ultrasonic wave of the ultrasonic wave generator (5), the pleated lines formed on the pleated cloth are provided with a film pattern section (4), thus melting and erasing the pleated lines.

Therefore, melt-cutting of the pleated cloth (1) for preventing thread unravelment at the end of the cloth (1) and the partial erasure of the pleated lines (2) are performed simultaneously, thus simplifying the working process and improving working efficiency.

Various type and shape of the patterns are capable of being formed at the end of the pleated cloth (1) by changing the pattern of the protrusions (7) and (8) of the roller (6). Still other variations of the patterns are also realized by changing the thickness of the protrusions (7) and (8).

While a preferred embodiment of the present invention has been described using specific terms, such description is for illustrative purpose only, and it is to be understood changes and variations may be made without departing from the spirit or scope of the following claims.

What is claimed is:

1. Improved pleated cloth made of thermoplastic fibers comprising
    (1) a strip-like film edge and (2) a film-like section in parallel alignment with said edge, said edge and said pattern section each having been formed by ultrasonic melting and said pattern section being substantially free of pleats.
2. A method for producing an improved pleated cloth, which comprises:
    forming pleated lines on a cloth made of thermoplastic resin and subjecting the pleated fabric to ultrasonic melting and contact with a patterned roll to provide the fabric with a strip-like film edge and a film-like pattern section in parallel alignment with said edge and to substantially erase pleats from said pattern section.

* * * * *